United States Patent [19]

Small

[11] 4,341,988

[45] Jul. 27, 1982

[54] VOLTAGE LEVEL DETECTOR FOR BATTERY CHARGER CONTROL CIRCUIT

[75] Inventor: James E. Small, Indianapolis, Ind.

[73] Assignee: Emhart Industries, Inc., Indianapolis, Ind.

[21] Appl. No.: 162,826

[22] Filed: Jun. 25, 1980

[51] Int. Cl.³ .............................................. H02J 7/10
[52] U.S. Cl. ........................................ 320/31; 320/38; 320/40
[58] Field of Search ....................... 320/32, 39, 40, 31, 320/37, 38

[56] References Cited

U.S. PATENT DOCUMENTS 4,105,962  8/1978  Scott et al. .............................. 32/32
4,198,593  4/1980  Ballman ................................. 320/31

Primary Examiner—Robert J. Hickey
Attorney, Agent, or Firm—Robert F. Meyer; David W. Gomes

[57] ABSTRACT

A voltage level detector for controlling a battery charger, includes a power supply circuit adapted to be coupled to a battery during charging thereof, a first voltage regulator for providing a supply voltage for the detector, the first voltage regulator being coupled to receive power from the power supply circuit, a second voltage regulator for providing a stable source of reference voltage, the second voltage regulator being coupled to receive power from the detector supply voltage, a voltage comparator having one input thereof coupled to the stable reference voltage source, circuitry for coupling the battery to the other input of the voltage comparator, the circuit for coupling being adapted to coupled a proportion of the battery voltage which proportion equals the stable reference voltage when the battery voltage reaches a predetermined maximum level, and control circuitry responsive to the output of the voltage comparator for controlling the charging of the battery in response to the battery voltage reaching the maximum desired level.

2 Claims, 1 Drawing Figure

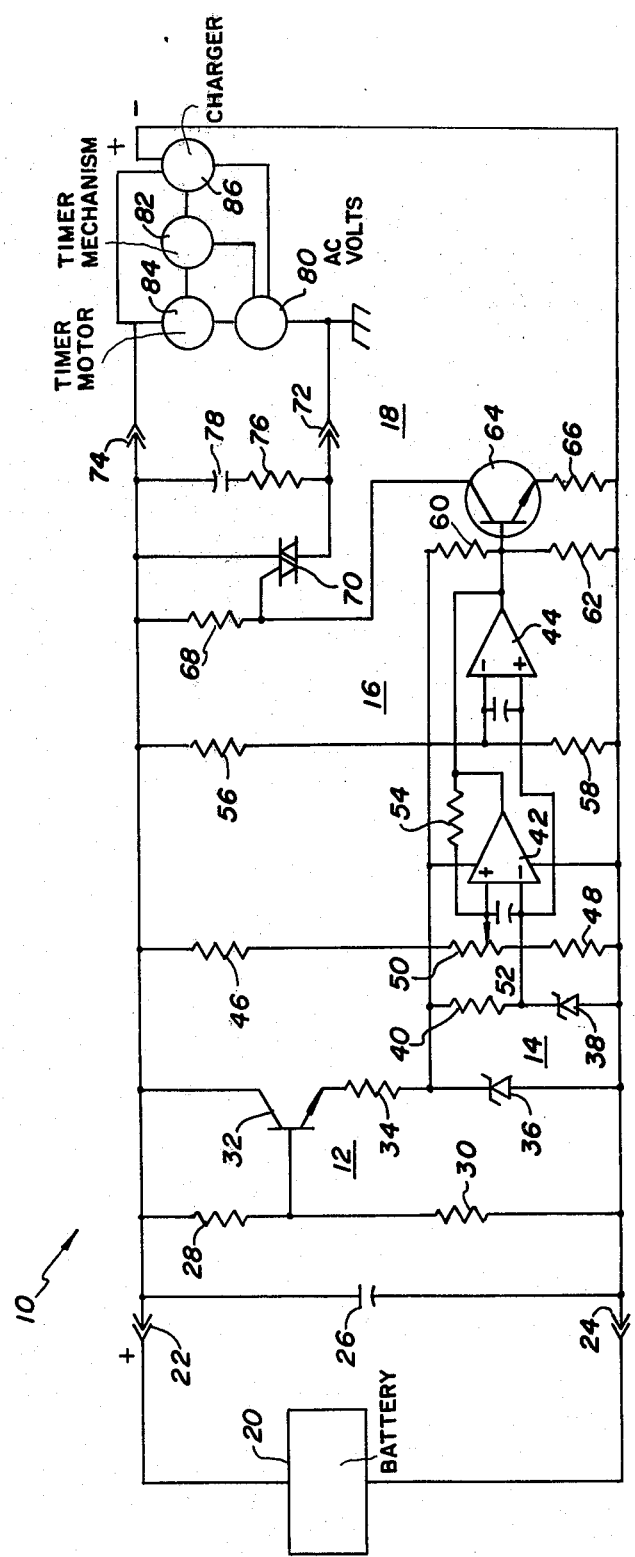

4,341,988

VOLTAGE LEVEL DETECTOR FOR BATTERY CHARGER CONTROL CIRCUIT

BACKGROUND OF THE INVENTION

1. Field Of The Invention

The present invention generally relates to voltage level detectors and, in particular, to those detectors used in battery charger control circuits.

2. Statement Of The Prior Art

Voltage level detectors are well known and have been widely used. One of such uses has been in control circuitry for battery chargers, and the like, where it is desired that the battery voltage not exceed a certain maximum level. This presents damage to the battery by overcharging. Because of the growing use of electrical devices powered by batteries and the desirability that such batteries be rechargeable, the importance of controlling the maximum battery voltage has remained, if not grown, along with the need that such control be both accurate and reliable.

SUMMARY OF THE INVENTION

Accordingly, a voltage level detector is presented for controlling a battery charger, comprising: power supply circuit means adapted to be coupled to a battery during charging thereof; first voltage regulations means for providing a supply voltage for the detector, the first voltage regulation means being coupled to receive power from the power supply circuit means; second voltage regulation means for providing a stable source of reference voltage, the second voltage regulation means being coupled to receive power from the detector supply voltage; voltage comparator means having one input thereof coupled to the stable reference voltage source; circuit means for coupling the battery to the other input of the voltage comparator means, the circuit means for coupling being adapted to coupled a proportion of the battery voltage which proportion equals the stable reference voltage when the battery voltage reaches a predetermined maximum level; and control circuit means responsive to the output of the voltage comparator means for controlling the charging of the battery in response to the battery voltage reaching the predetermined maximum level.

BRIEF DESCRIPTION OF THE DRAWING

The present invention is illustratively shown and described in reference to the FIGURE which is a schematic diagram of a battery charger control circuit including one embodiment of the present invention.

DESCRIPTION OF THE PREFERRED EMBODIMENT

The circuit 10 of the FIGURE generally includes a power supply section 12, a voltage regulation section 14, a voltage comparator section 16 and an output control section 18. The circuit 10 is shown coupled to monitor the voltage level of a battery 20.

More specifically, the circuit 10 is shown coupled to battery 20 via a pair of connectors 22 and 24. A capacitor 26 is shown connected across the input terminals 22 and 24 for purposes of filtering noise. A voltage divider is formed by a pair of resistors 28 and 30 connected in series and across the terminals 22 and 24. The purpose of the voltage divider is to form a bias voltage for the base of a transistor 32 having its collector connected to the positive input terminal 22 and its emitter connected through a resistor 34 and a zener diode 36 to the negative input terminal 24. The base of transistor 32 is connected to the connection point between resistor 28 and resistor 30. This arrangement provides a power supply circuit having an output which is relatively constant over a range of input voltages from the battery 20 as the battery voltage increases the voltage drop across resistor 30 likewise increase, causing a greater current to flow through the emitter of transistor 32. This in turn causes an increasing voltage drop across resistor 34. Thus, as the battery voltage across terminals 22 and 24 increases, so does the voltage drop across transistor 32. This tends to hold the current through zener diode 36 constant, therefore maintaining a relatively constant power dissipation for zener diode 36. The cathode of zener diode 36 is connected to resistor 34 and the anode of diode 36 is connected to the negative output terminal 24 thus causing the zener diode 36 to be reversed biased and operate as a voltage regulator.

The voltage regulation section 14 further includes a second zener diode 38 connected in series with a resistor 40, the pair of which are connected across zener diode 36. The cathode of zener diode 38 is connected to resistor 40 and the anode of diode 38 is connected to the anode of zener diode 36' thus reverse biasing zener diode 38 and causing it to also act as a voltage regulator. In one embodiment, the reverse bias voltage of zener diode 36 is 11 volts and the reverse bias voltage of zener diode 38 is 6.44 volts. Zener diode 38 is selected for voltage stability including stability over a wide operating temperature range. Any suitable zener diode may be used as the diode 38. One possible diode is that which is generally designated IN 4570.

The zener diode 38 is used as a stable reference voltage source and the voltage thereacross is connected to an input of each of a pair of voltage comparators 42 and 44. The anode of zener diode 38 is connected to the negative input terminal 24 which thus acts as a voltage reference, and the cathode of zener diode 38 is connected to the negative input of voltage comparator 42 and the positive input of voltage comparator 34. The voltage comparator section further includes a first voltage divider including a pair of resistors 46 and 48 and a potentiometer 50. The resistors 46 and 48 are each connected to a separate fixed end terminal of potentiometer 50, and the variable wiper terminal of potentiometer 50 is connected to the positive input of voltage comparator 42. The other ends of resistors 46 and 48 are connected between the positive and negative input terminals 22 and 24. As connected, the voltage divider including resistors 46 and 48 and potentiometer 50 acts as a means for coupling a proportion of the battery voltage, as delivered to terminals 22 and 24, to the input of the voltage comparator 42. As the wiper terminal of potentiometer 50 is variable, the proportionate share of the input voltage may be changed. In the present application, as that proportion of the battery voltage is being compared against a fixed reference voltage, variation of the proportionate part, in fact, varies the value of the battery voltage at which the voltage comparator will change the polarity of its output.

The circuit surrounding voltage comparator 42 further includes a capacitor 52 connected between positive and negative inputs thereof for the purpose of filtering noise for spurious signals, and a resistor 54 is connected between the output of comparator 42 and the positive input thereof. The output of voltage comparator 42 is further connected to the output of voltage comparator 44.

A second voltage divider is formed by a pair of resistors 56 and 58 which are connected in series across the input terminals 22 and 24. The interconnection between resistors 56 and 58 is connected to the negative input terminal of voltage comparator 44. Connected as such, the voltage divider of resistors 56 and 58 acts as a means for coupling a proportionate part of the battery voltage to the negative input of voltage comparator 44. This second proportionate share causes comparator 44 to sense a secondary predetermined level for the battery voltage. The secondary level is substantially above the predetermined maximum level. The purpose of this function is to prevent engagement of a rapid advance function of a battery charger timer. This is discussed in greater detail below.

A further voltage divider is formed by a pair of resistors 60 and 62 connected in series and across zener diode 36. The common connection point therebetween is connected to the outputs of voltage comparators 42 and 44. These outputs of voltage comparators 42 and 44 are further connected to the base of a transistor 64 for the purpose of outputting the signals therefrom. The emitter of transistor 64 is connected through a resistor 66 to the negative voltage terminal 24. The collector of transistor 64 is connected through a resistor 68 to the positive voltage terminal 22.

The output section 18 further includes a triac 70 having a first main terminal MT1 connected to the positive input terminal 22. Triac 70 further includes a gate terminal connected to the collector or transistor 64 and a second main terminal MT2 intended for connection to an output terminal 72. The first main terminal MT1 is connected to another output terminal 74 which is in common with the input terminal 22. A resistor 76 and a capacitor 78 are connected in series and across the main terminals MT1 and MT2 of triac 70, with the capacitor connected to the terminal MT1 and the resistor connected to MT2.

The output of the present circuit 10 is intended for controlling a battery charger having a timing motor with a rapid advance function. When properly connected, the circuit 10 will engage the rapid advance function to complete the charging cycle when the battery voltage reaches the predetermined maximum level. This arrangement is shown schematically in the FIGURE by having one side of a 120 VAC, 60 hertz supply 80 connected to terminal 72 and the other line thereof connected to the rapid advance means of a timing motor for controlling a battery charger 86. The other input to the rapid advance means is connected to the terminal 74.

In operation, the circuit 10 performs in the following manner. The timing mechanism 82 determines at what point the battery charger 86 is switched on. The battery charger 86 charges battery 20 until the voltage presented at the input terminals 22 and 24 of circuit 10 reaches the predetermined maximum level. During this charging process, the voltage at the positive input of voltage comparator 42 is less than the reference voltage presented at the negative input thereof. For this reason, the output of voltage comparator 42 is normally grounded until the predetermined maximum voltage level is reached. As the output of voltage comparator 42 is grounded, the base of transistor 64 is likewise grounded preventing current from flowing through resistor 68 and thus preventing the energization of triac 70 and engagement of the rapid advance means 84. Thusly, before the battery voltage reaches the maximum level, the timing mechanism 82 is allowed to proceed at its normal pace. As mentioned, the setting of potentiometer 50 is determined to cause the voltage presented at the positive input of amplifier 42 to equal the reference voltage presented at the negative input when the battery voltage reaches the maximum level. A variation of the potentiometer setting in fact varies the predetermined maximum voltage level which will be sensed by the voltage comparator 42. When the battery voltage reaches this maximum level, the output of voltage comparator 42 will change from a negative value to a positive value. As such, the positive voltage will forward bias the transistor 64 causing current to flow through resistor 68 and triac 70 to energize. This will engage the rapid advance means 84 of timing mechanism 82 and cause the timer to more quickly proceed through the remainder of the charging cycle and thus terminate the charging function.

During battery charging in which the battery voltage is either below or substantially equal to the maximum level, the negative input of operational amplifier 44 will have a lower value than the positive input thereof. Therefore, the output of voltage comparator 44 will be a positive voltage, or in the case where the output is represented by an open collector transistor, will simply be a logical high. Because the output of voltage comparators 42 and 44 are interconnected, a zero voltage signal at the output of either voltage comparator will result in a low or zero volts signal being supplied to the base of transistor 64. When the battery voltages reaches the maximum level, the output of voltage comparator 42 changes from a low to a high and a high or positive voltage is delivered to the base of transistor 64. The voltage divider of resistors 56 and 58 is selected to deliver a voltage to the negative input of voltage comparator 44 which represents a secondary predetermined battery voltage substantially higher than the predetermined maximum level. This secondary voltage level may nominally be 25 to 50 percent higher than the maximum level. The proportionate part selected is determined to equal the reference voltage supplied to the positive input when the battery voltage equals this secondary level. Should the battery voltage perceived by the negative input exceed this secondary level, the output of voltage comparator 44 will become zero volts thus preventing the transistor 64 from conducting. The purpose for voltage comparator 44 and its associated circuitry is to prevent rapid advance of the timing mechanism under circumstances where there is no battery 20 connected to terminals 22 and 24. Under such circumstances, the voltage appearing across terminals 22 and 24 will appear to be much higher than the maximum desired level to the negative input of comparator 44 which will then inhibit engagement of the rapid advance function. This feature is useful in instances where the charger is set to deliver a charge for a given time period when the battery is yet to be connected thereto.

Thus as described in reference to the embodiment shown, the present invention provides a reliable and highly accurate voltage detector circuit for controlling the operation of a battery charger. Versatility is further provided by allowing control of the charging rate and charging time while still maintaining the monitoring feature provided.

The above description of this embodiment of the present invention is intended to be taken in an illustrative and not in a limiting sense. Further, it is recognized that persons having ordinary skill may make various modifications and changes to the described embodiment without departing from the scope of the appended claims.

What is claimed is:

1. A battery charger, comprising:

power supply circuit means adapted to be coupled to a battery during charging thereof;

first voltage regulation means for providing a supply voltage for said detector, said first voltage regulation means being coupled to receive power from said power supply circuit means and including a first zener diode;

second voltage regulation means for providing a stable source of reference voltage, said second voltage regulation means being coupled to receive power from said detector supply voltage and including a second zener diode having a very stable reverse bias voltage for providing said reference voltage source;

voltage comparator means having one input thereof coupled to said stable reference voltage source;

circuit means for coupling said battery to the other input of said voltage comparator means, said circuit means for coupling being adapted to couple a proportion of the battery voltage which proportion equals said stable reference voltage when said battery voltage reaches a predetermined level;

control circuit means responsive to the output of said voltage comparator means for controlling the charging of said battery in response to said battery voltage reaching said predetermined maximum level, said control circuit means including means for terminating the charging of said battery in response to said battery voltage reaching said predetermined maximum level;

a second voltage comparator means having an input thereof coupled to said stable reference voltage source;

second circuit means for coupling said battery voltage to the other input of said second voltage comparator means, said second circuit means for coupling being adapted to couple a proportion of said battery voltage, which proportion equals said stable reference voltage when said battery voltage reaches a secondary predetermined level which is substantially higher than said predetermined maximum level; and second control circuit means responsive to the output of said second voltage comparator means for disabling the terminating function of first said control circuit means when said secondary voltage level is reached.

2. The detector of claim 1, wherein said circuit means for coupling includes a voltage divider circuit connected across said battery voltage and having a potentiometer for allowing adjustment of the proportion of said battery voltage coupled to said other voltage comparator means input and thereby allowing adjustment of said predetermined maximum level for said battery voltage.

* * * * *